United States Patent [19]

Brézillon

[11] Patent Number: 4,806,441
[45] Date of Patent: Feb. 21, 1989

[54] METHOD OF MANUFACTURING PLASTIFIED ELECTRODES FOR STORAGE BATTERIES

[75] Inventor: Jean L. Brézillon, Parempuyre, France

[73] Assignee: Saft, S.A., Romainville, France

[21] Appl. No.: 124,590

[22] Filed: Nov. 24, 1987

[30] Foreign Application Priority Data

Dec. 4, 1986 [FR] France .................................. 86 16984

[51] Int. Cl.$^4$ ...................... H01M 4/74; H01M 4/62; H01M 6/00; B23P 19/00
[52] U.S. Cl. .................................. 429/241; 429/217; 24/623.5; 24/730
[58] Field of Search ............... 429/137, 212, 241, 217; 29/623.5, 730, 731

[56] References Cited

U.S. PATENT DOCUMENTS 4,081,005  3/1978  Gray et al. ...................... 29/623.5 X
4,161,815  7/1979  Land et al. ......................... 29/730 X

FOREIGN PATENT DOCUMENTS 0077030  4/1983  European Pat. Off. .
0185830  7/1986  European Pat. Off. .
WO86/02494  4/1986  World Int. Prop. O. .

Primary Examiner—Stephen J. Kalafut
Attorney, Agent, or Firm—Kenyon & Kenyon

[57] ABSTRACT

The invention relates to polymer-consolidated electrodes for alkaline storage cells. These electrodes are cut out from a support which is coated with a plastified active material. In accordance with the invention, the edges (2, 3) of the electrodes (1) as cut out in this way are reinforced by a layer of polyolefin (5), e.g. paraffin.

6 Claims, 1 Drawing Sheet

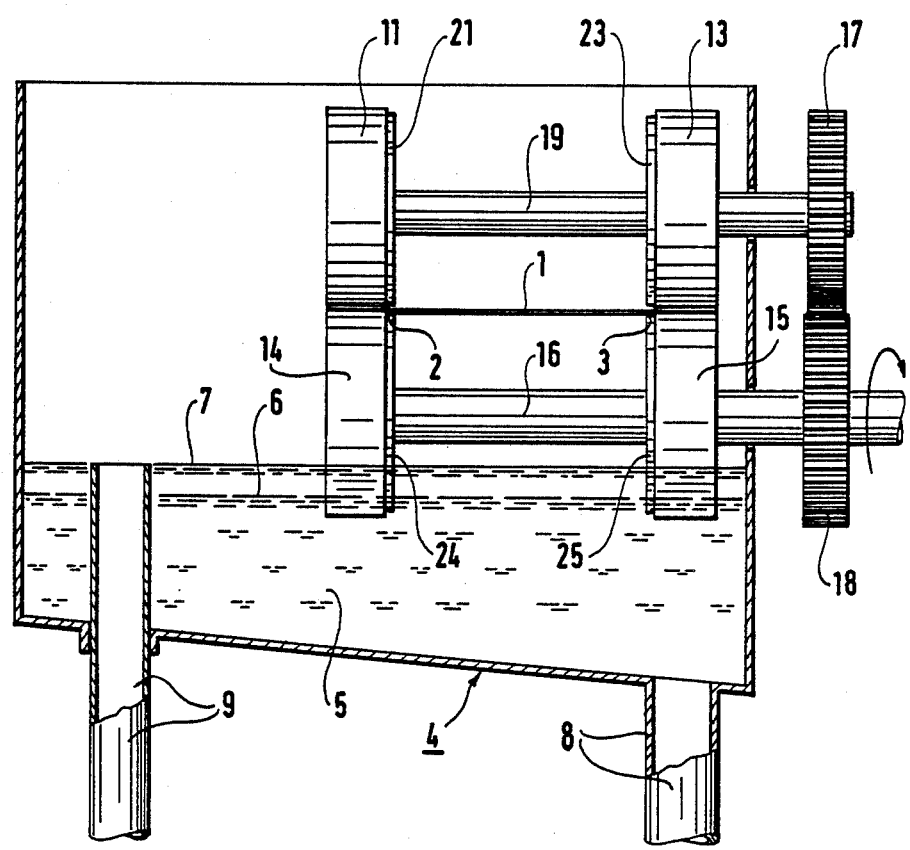

METHOD OF MANUFACTURING PLASTIFIED ELECTRODES FOR STORAGE BATTERIES

The present invention relates to a method for manufacturing plastified electrodes for storage batteries, in particular for alkaline storage batteries, and it relates more particularly to the edges of such electrodes.

BACKGROUND OF THE INVENTION

One way of making such an electrode is to take a metal support such as a perforated metal sheet and to coat or calender layers of active paste on its faces. The paste contains the active material together with a polymer which acts as a plastic binder, and its concentration is optimized with respect to three criteria:

the mechanical strength of the electrode which increases with increasing concentration of binder;

the electrical conductivity of the plastified mass which decreases with increasing binder concentration; and its suitability for electrochemical operation which is a more complex criterion that takes into account several of the properties of the plastified mass: wettability by the electrolyte; and chemical compatibility and stability of the binder with the active material of the electrolyte; this suitability for electrochemical operation also decreases with increasing concentration of binder.

Electrodes are thus made whose mechanical strength is adequate for enabling storage batteries to be assembled and for ensuring adequate stability in electrode performance.

The manufacturing method includes a cutting stage in which the support coated with the active mass is cut out to a desired size. It has been observed that an electrode obtained in this way is mechanically weak along the lines of cut and that during subsequent manipulations inherent to assembly, the edges of the electrode crumble. Later on, during normal operation of the storage battery, losses of active matter are also observed around the edges and these may give rise to short circuits and consequenty to the storage battery being put out of service.

The present invention seeks to avoid this drawback.

SUMMARY OF THE INVENTION

The present invention provides a method of manufacturing plastified electrodes for a storage battery in which the faces of a perforated metal support are coated with a layer of paste containing an electochemically active material and a plastic binder, are dried, and then the support is cut to the size required for an electrode, the method being characterized by the fact that the edges of the electrode along the lines of cut are coated with a polyolefin in the melted state, and polyolefin being selected for its high degree of chemical inertness relative to the electrolyte and to the active materials to be found in said storage battery, and for its melting temperature which must be greater than normal operating temperature of the storage battery.

Preferably said polyolefin in the melted state is to be found, at the moment it is applied to said edges, at a temperature which is greater than its solidification temperature by at least 60° C.

Paraffin is quite suitable for alkaline storage batteries.

The present invention also provides apparatus for implementing the above method, characterized by the fact that it comprises at least two identical rolls disposed one above the other and turning synchronously, each roll having a groove on the edge of one of its faces, with the grooves of the two rolls facing one another and co-operating in such a manner as to receive ones of the edges of the electrode to be processed, with one of the rolls being partially immersed in a bath of polyolefin in the melted state.

The present invention also provides a plastified electrode for an alkaline storage battery, the electrode comprising a perforated metal sheet covered on both faces with a plastified electrochemically active mass, the electrode being characterized by the fact that at least one of its edges is coated with a polyolefin over a width of 1 to 2 mm, which polyolefin penetrates into said active mass.

BRIEF DESCRIPTION OF THE DRAWING

A particular implementation of the present invention is described by way of example with reference to the accompanying drawing, in which the sole FIGURE is a partially cut-away and highly diagrammatic elevation of a machine suitable for reinforcing the edges of an electrode by implementing the method of the invention.

MORE DETAILED DESCRIPTION

An electrode 1 is shown in cross-section with its edges being referenced 2 and 3. The electrode is quite dry and is cut to the format required for subsequent assembly in a storage battery. A tank 4 contains paraffin 5 in the melted state; the lowest and highest levels of the paraffin 5 in the tank 4 are referenced 6 and 7; the tank includes an inlet 8 and an overflow 9 for the paraffin 5. The temperature of this polyolefin is greater than 60° C. to 80° C. at its melting point. The installation includes two top rolls 11 and 13 on a shaft 19 and two bottom rolls 14 and 15 on a shaft 16 all of which are caused to rotate synchronously by means of gears 17 and 18.

The rolls 11, 14, 13, and 15 each have one face with a respective groove 21, 24, 23, or 25. The rolls are spaced apart and disposed in such a manner as to constitute a housing for those portions of the edges 2 and 3 of the electrode 1 which are to be processed.

By virtue of the rolls rotating, and because two of them (the rolls 14 and 15) are dipped in the paraffin, edging is performed simultaneously on both edges 2 and 3 at a speed of 8 to 15 cm/second. By way of example, the grooves are 2 mm deep and wide.

The paraffin diffuses very quickly through the thickness of the electrode prior to solidifying. Since the electrode enters the machine at ambient temperature, this solidification takes place very quickly (2 to 4 seconds) after the substance has been applied thereto. Thereafter, the electrodes may be manipulated and may be stacked without taking special precautions in the racks used for transporting them to a storage battery assembly station. Since the electrodes are driven before and after the edging operation by conveyor belts driven at a speed of 8 to 15 cm per second, the speed at which the method is implemented in particularly advantageous since it enables the overall bulk of the machine to be limited.

The area affected by the edging is clearly defined by the geometry of the applying rolls. Depending on the widths of the plates, the edge area constitutes between 2.5% to 5% of the total active area of the electrodes. The quantity of edging material used remains small, e.g. 0.3% to 1 % of the mass of the electrodes; however the local concentration in the edged region may be as much as 15% to 20% by weight relative to the active material, thereby explaining the considerably increase in cohesion of the active material in this region. The following results have been obtained by performing shear force measurements on the active material in sheets of polymer-consolidated electrode samples:

prior art electrode: 2.7 daN/cm$^2$ electrode in accordance with the invention: 4.05 daN/cm$^2$.

By virtue of this increase in cohesion along the edges of the electrodes, loss of material by peeling or shedding from the edges of the plates is completely avoided.

The main advantages of the method are the ease and speed with which it can be implemented. The accuracy with which the polyolefin is deposited makes it possible to have high local concentration of the consolidation material. The reinforcement of the mechanical strength obtained in this way along the edges of electrodes makes it possible to reduce the concentration of binder used in the preparation of the plastified active mass, thereby achieving a better compromise between strength and performance in electrodes which are made in this way.

In a variant implementation, the paraffin may be mixed with an ethylene polymer to a concentration which is less than 30% by weight, e.g. lying between 10% and 30%. This may be the MK 2000 type substance sold by the company "Charbonages de France" CHIMIE; its density is 0.91. Its fluidity index IF is 200 grams per 10 minutes; its melting range is 100° C. to 104° C.

Naturally, the invention is not limited to the above-mentioned implementations. In particular, any equivalent means could be used to replace those described without going beyond the scope of the invention.

I claim:

1. A plastified electrode for an alkaline storage battery, the electrode comprising a perforated metal sheet covered on both faces with a plastified electrochemically active mass, the electrode having at least one cut edge, the cut edge being coated with a polyolefin over a width of 1 mm to 2 mm, which polyolefin penetrates into said active mass so as to mechanically strengthen the cut edge of the active mass and to reduce disintegration of the cut edge of the active mass.

2. A method of manufacturing plastified electrodes for a storage battery, the method including coating opposite faces of a perforated metal support with a layer of paste containing an electrochemically active material and a plastic binder, drying the layer of paste on each face of the support, and cutting at least one edge of the pasted support to reduce the pasted support to the size required for an electrode, wherein the improvement comprises:

coating each cut edge of the dried paste layers on the support with a polyolefin in the melted state, said polyolefin being selected to have a high degree of chemical inertness relative to predetermined active materials and electrolyte of the storage battery and to have a melting temperature higher than a normal operating temperature of the storage battery.

3. A method according to claim 2 wherein the temperature of the melted polyolefin at the moment of coating the cut edges of the dried paste layers is at least 60° C. higher than the solidification temperature of the polyolefin.

4. A method according to claim 2 or 3 wherein the polyolefin is paraffin mixed with not more than 30% by weight of an ethylene polymer.

5. A method according to claim 2 or 3 wherein the polyolefin consists of paraffin.

6. Apparatus for coating a cut edge of a pasted-plate electrode with a polyolefin in the melted state, the apparatus comprising a first roll disposed above a second roll and means for driving the rolls in synchronism, each roll having a cylindrical surface with an edge formed with a groove, the grooves of the first and second rolls facing one another and cooperating so as to receive the cut edge of an electrode to be coated and one of the rolls being partially immersed in a bath of polyolefin in the melted state.

* * * * *